United States Patent [19]

Scibelli

[11] 4,289,088
[45] Sep. 15, 1981

[54] STERILITY INDICATING DEVICE

[75] Inventor: John V. Scibelli, Woodbury, Minn.

[73] Assignee: Minnesota Mining and Manufacturing Co., Saint Paul, Minn.

[21] Appl. No.: 145,214

[22] Filed: Apr. 29, 1980

[51] Int. Cl.$^3$ .................................... G01K 11/06
[52] U.S. Cl. ................................ 116/218; 73/358; 252/408
[58] Field of Search .............. 73/358; 116/218, 217, 116/219; 252/408

[56] References Cited

U.S. PATENT DOCUMENTS

| | | | |
|---|---|---|---|
| 945,978 | 1/1910 | Nielsen et al. | 73/358 |
| 1,441,307 | 1/1923 | Swamberg | 73/358 |
| 3,090,235 | 5/1963 | Houser | 73/358 |
| 3,548,780 | 12/1970 | Kliewer | 73/358 |
| 3,559,615 | 2/1971 | Kliewer | 116/218 |
| 3,682,130 | 8/1972 | Jeffers | 73/358 |
| 3,693,579 | 9/1972 | Kliewer | 73/358 |
| 3,965,849 | 6/1976 | Gee | 116/218 |
| 3,981,683 | 9/1976 | Larsson et al. | 73/358 |
| 4,170,956 | 10/1979 | Wear | 73/358 |

Primary Examiner—Teddy S. Gron

Attorney, Agent, or Firm—Cruzan Alexander; Donald M. Sell; James V. Lilly

[57] ABSTRACT

A device for indicating the attainment of a sterile condition in an autoclave is described. The device provides a yes/no indication of the attainment of sterility through the use of a fusible material to prevent premature indication. The fusible material has the formula

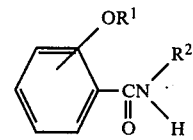

wherein said —OR$^1$ group is located ortho or meta to said

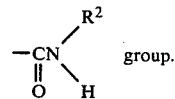

group.

9 Claims, 2 Drawing Figures

STERILITY INDICATING DEVICE

TECHNICAL FIELD

This invention relates to devices that indicate the attainment of sterility in steam autoclaves. More particularly, it relates to devices that give a visual yes/no indication of the attainment of sterility.

BACKGROUND ART

Steam sterilization is a well known technique for destroying various microorganisms. Typically it is carried out at temperatures of from about 120° C. to 140° C. and steam pressures of from about 1 to 2 kilograms per square cm in an autoclave. The time required for such sterilization varies from about 2 minutes at 140° C. to about 15 minutes at 120° C.

It is highly desirable to have some method or device that indicates that a sterile condition has been achieved in the autoclave. The method or device is preferably accurate, fast, and inexpensive, and it must be dependable. Although several techniques have been previously utilized to indicate the attainment of a sterile condition, none have proven entirely satisfactory.

For example, spore strips have been placed in the autoclave with the material to be sterilized. These strips contain microorganisms that are difficult to destroy. After completion of the sterilization cycle the strips are examined to determine if the spores can reproduce in a suitable culture medium. If they cannot, sterilization is deemed adequate. While this technique is accurate, it is lengthy (i.e., it requires from several hours to several days to determine if the spores can reproduce); there is variation between lots of spores; the spores become less resistant to heat upon storage; the test is expensive to perform.

Attempts have also been made to indicate the attainment of sterility by the use of chemicals that either melt at a given temperature or that undergo a chemical reaction that brings about a color change. However, these techniques only indicate whether or not the autoclave has been held at a temperature for a time sufficient to cause melting or the chemical reaction to take place. Additionally, they generally do not give an absolute yes/no indication. Thus, the signal given by each must be interpreted so as to determine the degree of melting or color change.

Yet another attempt to provide a satisfactory indicator utilizes an organic compound that has a melting point higher than the sterilization temperature to be monitored, a wick that absorbs the liquid form of the organic compound by capillary action, and a steam-permeable cover that totally encloses the organic compound and the wick. Such a device is disclosed in U.S. Pat. No. 3,981,683.

In operation, the organic compound begins to melt when exposed to a predetermined temperature in the presence of steam. The wick draws the liquid organic compound away. A sterile condition is deemed achieved when the liquid has travelled up the wick a predetermined length.

This device depends upon the permeability of the cover to steam and the capillary action of the wick in order to be effective. Consequently, its reliability is dependant upon the lot-to-lot variability of the materials used in both the cover and the wick. Furthermore, it requires that the user interpret the amount of wicking that has occurred in order to determine if sterility has been achieved.

DISCLOSURE OF INVENTION

The present invention, on the other hand, provides an accurate, dependable, fast, and inexpensive device that indicates the attainment of sterility in steam autoclave sterilization processes. Attainment of sterility is indicated by a visual signal that immediately tells the user that the desired condition has been attained. The device comprises:

an elongate hollow element having means that permits steam to enter the hollow portion thereof;

an indicating means within said hollow element that is moveable relative to said hollow element;

a biasing means for causing movement of said indicating means relative to said hollow element; and a restraining means within said hollow element for preventing movement of said indicating means until the attainment of a predetermined temperature in the presence of steam, whereupon said restraining means fuses and permits said biasing means to move said indicating means relative to said hollow element thereby indicating the attainment of sterility, said restraining means having the formula

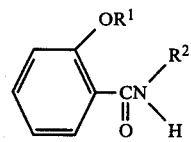

wherein $R^1$ is a lower alkyl group containing from 1 to about 4 carbon atoms, and $R^2$ is selected from hydrogen and lower alkyl groups containing from 1 to about 4 carbon atoms, and wherein said —$OR^1$ group is located ortho or meta to said

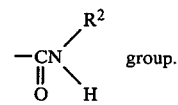 group.

The device of the present invention gives a yes/no indication of the attainment of sterility. This indication is instantaneous, that is, there is no gradual indication of attainment. Thus, the user need not interpret the degree of melting, color change, or wicking as must be done with prior art types of devices.

Still further, the response of the devices of the invention is essentially independent of the attitude of the device in the autoclave over the range of temperatures most commonly used for steam autoclave sterilization (i.e., 120°–140° C.). Thus the devices may be used in an upright, horizontal, up-side down, or angled position.

BRIEF DESCRIPTION OF THE DRAWINGS

The present invention is described in more detail hereinafter with reference to the accompanying drawings wherein like reference characters refer to the same parts throughout the several views and in which.

DETAILED DESCRIPTION

The device of the present invention employs a class of compounds having the formula set forth above as the restraining means. The restraining means has a sharp trigger temperature, that is the temperature at which the indicating device signals the attainment of the predetermined temperature in the presence of steam. Additionally, the material of the restraining means must be capable of crystallizing in the form of a solid pellet of high sheer strength so that in the solid state it will resist the forces of the biasing means and thereby hold the indicating means in a non-indicating position until attainment of the predetermined temperature for an appropriate length of time in the presence of steam.

While a number of materials have been previously suggested for use in steam sterilization, (see for example U.S. Pat. No. 3,981,683) it has been discovered that only the class of materials described above possess the requisite combination of trigger temperature, strength in the crystal form, and response time when exposed to steam autoclave conditions to be useful in the present invention. Moreover, it has been discovered that other materials suggested in said patent did not release the indicating means of the indicating device invention when a sterile condition had been achieved. Consequently, they did not function as useful sterility indicating devices.

The class of compounds useful as the restraining means may be described as alkoxybenzamides. The alkoxy group is located in the ortho, or meta position to the amide group. Preferably the alkoxy group is located ortho to the amide group. It is further preferred that $R^1$ be an ethyl group, most preferably in the ortho position, and that $R^2$ be hydrogen. This compound is also known as 2-ethoxybenzamide (available from the Aldrich Chemical Company).

Examples of other compounds useful as the restraining means include

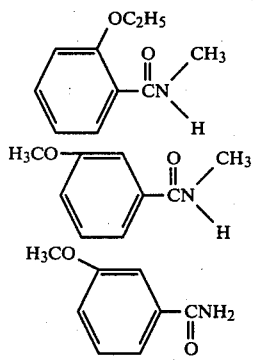

Figure 1:
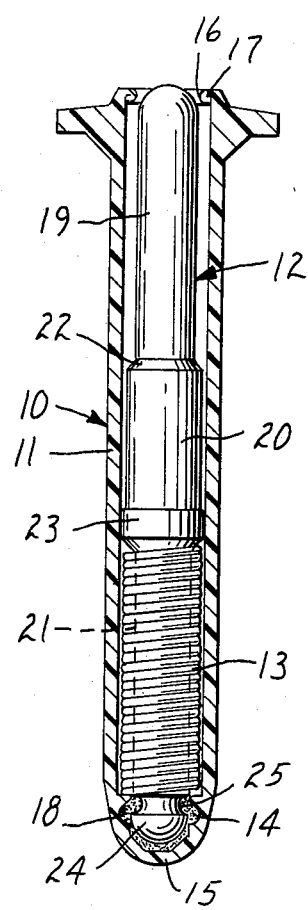
FIG. 1 is a cross-sectional view of a preferred embodiment of the invention having the indicating means in a non-indicating position.

Referring now to the figures, FIG. 1 shows a device 10 that comprises an elongate hollow element 11, and, within hollow element 11, indicating means 12, biasing means 13, and restraining means 14.

Element 11 has a closed end 15 and an open end 16. Open end 16 is preferably provided with a reverse curl lip 17 which is adapted to slideably receive indicating means 12 and form a mating seal therewith when the indicating means is in the raised position. (See FIG. 2.)

In addition to permitting indicating means 12 to slide therethrough, open end 16 also permits steam to enter the elongate hollow element 11 and interact with the restraining means 14. Preferably, the opening in open end 16 is at least about 0.3 cm in diameter.

Alternatively, open end 16 once device 10 has been assembled, may be sealed if desired. However, in this event either an opening is provided somewhere in element 11, or the material used to manufacture element 11 is permeable to steam so that steam may contact the material of the restraining means. Device 10 may be sealed by, for example, placing a rupturable film over open end 16. The film must allow the force generated by biasing means 13 to rupture it and allow indicating element 12 therethrough.

The material of construction of elongate element 11 is not critical to the present invention, provided that it is capable of (i) withstanding the rigors of the environment to which the device is subjected, and (ii) conducting the thermal energy provided by the autoclave to the restraining means 14. Examples of materials useful in manufacturing elongate element 11 include metals (such as aluminum, brass, steel, etc.), glass, and organic polymers such as polyamides (e.g., nylon-6), polyolefins (e.g., polypropylene), etc. Preferably the elongate element is made from a polyamide such as nylon-6.

The shape of elongate member 11 is likewise not critical to the present invention. Thus, it may comprise a simple cylinder, or, alternatively, a body that has a compound cross section. Additionally, it may be symmetrical or asymmetrical. Preferably, however, elongate body comprises a cylinder with a substantially circular cross section.

Figure 2:
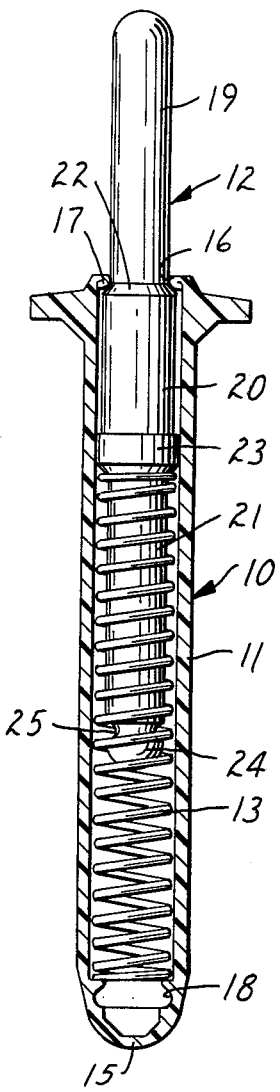
FIG. 2 is a cross-sectional view of the embodiment of FIG. 1 having the indicating means in an indicating position.

Closed end 15 of elongate element 11 preferably has a compound configuration. One useful configuration is shown in FIGS. 1 and 2. Thus, the interior of element 11 terminates in closed end 15 which is adapted to receive rounded end portion 24 of indicating means 12. Located in element 11 and above closed end 15 is a channel 18 which extends at least partially around, and communicates with the interior of, said body. Channel 18 is situated within element 11 so that it is in substantial registry with annular groove 25 of indicating means 12 when the indicating means is in the lowered position.

As can be seen by reference to FIGS. 1 and 2, indicating element 12 comprises upper section 19, intermediate section 20, and lower section 21. Upper section 19 is joined to intermediate section 20 by means of shoulder 22.

Upper section 19 has a smaller diameter than that of the opening through open end 16 of element 11. Intermediate section 20, on the other hand, has a larger diameter than that of the opening. Thus, when device 10 has triggered, shoulder 22 stops the upward movement of indicating means 12.

Intermediate section 20 is joined to lower section 21 by means of collar 23. Collar 23 has substantially the same diameter as the portion of the interior of element 11 within which it is disposed yet allows steam to pass around it and contact restraining means 14. This keeps upper section 19 of indicating means 12 in registry with the opening through end 16 of element 11. Additionally, collar 23 serves as a top restraint for biasing means 13.

Lower section 21 terminates in a rounded end portion 24 that has an annular groove 25 therearound. When indicating means 12 is in the depressed condition (see FIG. 1) the restraining means 14 fills the lower portion of the hollow element 11, surrounds rounded end portion 24 of the indicating means and extends at least partially into annular ring 25. As a result, when restraining means 14 has solidified, it holds the indicating means in a lowered or non-indicating position in the embodiment shown.

Indicating means 12 is preferably longitudinally axially disposed within elongate hollow element 11. In the embodiment shown in FIG. 1, indicating means 11 is situated so that it is substantially totally disposed within element 11 prior to the attainment of the predetermined sterilization conditions. FIG. 2 shows that device 10 has triggered, that is, that a sterile condition has been achieved. As can be seen by reference to this figure, indicating means 12 is in an elevated position relative to device 10.

Although the figures indicate a device of the "pop-up" type, the indicating device of the present invention may be adapted to operate in other manners. Thus, it may operate as a pop-down device wherein the indicating means is raised prior to the attainment of sterilization and lowered after attainment of sterilization. Alternatively, the indicating means may be disposed so as to rotate to an indicating position without changing its height relative to the housing. In any event, the exact type of movement of the indicating means relative to the elongate element is not critical to the invention.

Indicating means 12 may be constructed from the same materials used for elongate element 11. Additionally, it may comprise a simple cylindrical element, or a compound element such as is shown in the Figures.

The movement of the indicating means relative to the elongate hollow element so as to indicate the attainment of a sterile condition is brought about by biasing means 13. In the embodiments shown, such movement is between lowered and raised positions, although, as pointed out previously, other movements are also possible. Typically the biasing means comprises a spring. Said spring is generally held in compression until restraining means 14 fuses. However, the biasing means may be held in any configuration provided that upon fusing of the restraining means the biasing means can urge the indicating means to an indicating position.

Restraining means 14 may either secure the indicating means directly to the elongate element as shown in the Figures, or, alternatively, it may directly restrain the biasing means 16 such as by either joining the biasing means to itself or encasing the biasing means within the restraining means. Still other arrangements are possible as will be understood by those skilled in the art.

The quantity of restraining means employed in the device of the invention need only be sufficient to hold the indicating means in a non-indicating position until a sterile condition has been attained in a steam autoclave. It has been found that 15 milligram (mg) of the restraining means is sufficient, although preferably about 22 mg is employed.

The signalling devices of the invention may be easily assembled. For example, the embodiment shown in the figures may be assembled by inserting a predetermined quantity of the solid restraining means into elongate hollow element 11. The biasing means and the indicating means are then inserted into element 11, and the reverse curl lip formed in end 16. Methods of forming the reverse curl lip are described in U.S. Pat. No. 3,965,849.

The indicating means is then urged toward the end 15 of element 11 thereby compressing biasing means 13 and held in this position until completion of the manufacturing process. The device is then subjected to heat, such as a temperature of about 290° C. for 1 to 2 minutes, until restraining means 14 has fused. The device is then immersed in a cooling bath (e.g., water maintained at ambient temperature) for a time sufficient to cause the restraining means 14 to resolidify and maintain indicating means 11 in the lowered position. The compression applied to indicating means 12 is then removed and the indicating means is thereafter maintained in a lowered or non-indicating position by means of the restraining means alone.

The assembled signalling devices are then quality assurance tested by heating them to a temperature of about 120° C. in the absence of steam. This insures that unsatisfactory devices would be identified as they will prematurely trigger.

The present invention is further exemplified in the following examples.

EXAMPLES 1-13

Various indicating devices of the type shown in the Figures were prepared. The elongate hollow elements and indicating rods comprised nylon-6. Twenty-two mg ($\pm 2$ mg) of various restraining means were used.

The completed devices were placed in a steam autoclave and tested for response at various temperatures. A positive response was indicated when the restraining means fused allowing the indicating rod to pop up. The results of these tests are contained in the table below.

TABLE

| Example | Restraining Means | Test Temp (°C.) | Response Time (Min.) |
| --- | --- | --- | --- |
| 1 | 2-ethoxybenzamide | 120 | 16.2 |
| 2 | 2-ethoxybenzamide | 123 | 9.4 |
| 3 | 2-ethoxybenzamide | 127 | 5.4 |
| 4 | 2-ethoxybenzamide | 132 | 1.8 |
| 5 | 3-methoxybenzamide | 120 | 25 |
| 6 | 3-methoxybenzamide | 132 | 3 |
| 7 | Urea | 120 | None at 20 |
| 8 | Succinimide | 120 | None at 20 |
| 9 | Benzamide | 120 | None at 20 |
| 10 | Dihydroxybenzophenone | 120 | None at 20 |
| 11 | Cinnamic Acid | 120 | None at 20 |
| 12 | 3-nitrosalicylic acid | 120 | None at 20 |
| 13. | 4-methoxybenzamide | 120 | None at 20 |

When examples 5, and 8-10 were repeated at a test temperature of 132° C., the devices gave no response after 10 minutes.

What is claimed is:

1. A device for indicating the attainment of sterility in a steam autoclave comprising
    an elongate hollow element having means for permitting steam to enter the hollow portion thereof;
    an indicating means within said hollow element that is movable relative to said hollow element;
    a biasing means for causing movement of said indicating means relative to said hollow element; and
    a restraining means within said hollow element for preventing movement of said indicating means until the attainment of a predetermined temperature in the presence of steam, whereupon said restraining means fuses and permits said biasing means to move said indicating means relative to said hollow element thereby indicating the attainment of sterility, said restraining means having the formula

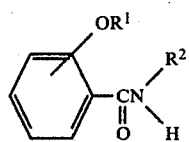

wherein $R^1$ is a lower alkyl group containing from 1 to about 4 carbon atoms, and $R^2$ is selected from hydrogen and lower alkyl groups containing from 1 to about 4 carbon atoms, and wherein said $-OR^1$ is located ortho or meta to said

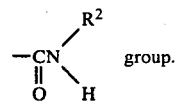

group.

2. A device according to claim 1 wherein $R^1$ is ethyl.

3. A device according to claim 2 wherein $R^2$ is hydrogen.

4. A device according to claim 3 wherein said restraining means is 2-ethoxybenzamide.

5. A device according to claim 1 wherein said elongate hollow element has at least one open end.

6. A device according to claim 1 wherein said elongate hollow element comprises a polymeric material.

7. A device according to claim 6 wherein said polymeric material comprises a polyamide.

8. A device according to claim 7 wherein said polyamide comprises nylon-6.

9. A device according to claim 1 wherein said elongate hollow element substantially comprises a cylinder.

* * * * *